US011332691B2

United States Patent
Rapinel et al.

(10) Patent No.: US 11,332,691 B2
(45) Date of Patent: May 17, 2022

(54) PROCESS FOR PRODUCING OILS AND DEFATTED MEAL BY MEANS OF SOLID/LIQUID EXTRACTION

(71) Applicant: PENNAKEM EUROPA, Dunkirk (FR)

(72) Inventors: Vincent Rapinel, Montfavet (FR); Norbert Patouillard, Charbonnieres les bains (FR); Farid Chemat, Avignon (FR); Anne-Sylvie Fabiano Tixier, Avignon (FR); Karine Ruiz, Avignon (FR); Laurence Jacques, Dunkirk (FR)

(73) Assignee: PENNAKEM EUROPA, Dunkirk (FR)

( * ) Notice: Subject to any disclaimer, the term of this patent is extended or adjusted under 35 U.S.C. 154(b) by 0 days.

(21) Appl. No.: 17/044,761

(22) PCT Filed: Dec. 17, 2019

(86) PCT No.: PCT/FR2019/053125
§ 371 (c)(1),
(2) Date: Oct. 1, 2020

(87) PCT Pub. No.: WO2020/128307
PCT Pub. Date: Jun. 25, 2020

(65) Prior Publication Data
US 2021/0108150 A1    Apr. 15, 2021

(30) Foreign Application Priority Data
Dec. 17, 2018  (FR) ...................................... 18 73103

(51) Int. Cl.
| C11B 1/10 | (2006.01) |
| A23D 9/007 | (2006.01) |
| B01D 11/02 | (2006.01) |
| C11B 3/14 | (2006.01) |

(52) U.S. Cl.
CPC ............... *C11B 1/10* (2013.01); *A23D 9/007* (2013.01); *B01D 11/0288* (2013.01); *B01D 11/0292* (2013.01); *C11B 3/14* (2013.01)

(58) Field of Classification Search
CPC ......... C11B 1/10; C11B 1/14; B01D 11/0288; B01D 11/0292; A23D 9/007
See application file for complete search history.

(56) References Cited

U.S. PATENT DOCUMENTS

| 6,737,088 B1* | 5/2004 | Kealey | ................... | A21D 2/364 424/776 |
| 2008/0014322 A1* | 1/2008 | Ibarra | ................... | A23L 3/3472 426/330.6 |

| 2008/0286254 A1 | 11/2008 | Sakamoto et al. |
| 2012/0294887 A1* | 11/2012 | Saunois ................ A23L 33/115 424/195.17 |
| 2014/0213759 A1 | 7/2014 | Monnaie et al. |

FOREIGN PATENT DOCUMENTS

| CA | 1207320 A |  | 7/1986 |
| GB | 2110519 A | * | 6/1983 |
| WO | 2011092334 A2 |  | 8/2011 |
| WO | 2011092334 A3 |  | 3/2012 |
| WO | 2012171982 A1 |  | 12/2012 |

OTHER PUBLICATIONS

Popova, T.S., et al., HPLC Investigation fo flavonoids in teh blackcurrant (*Ribes nigrum* L.) buds and leaves, Pharmacy, the Scientific-Applied Journal, 2, page abstract (Year: 2015).*
Pace, V. et al., 2-methyltetrahydrofuran (2-MeTHf): A biomass-derived solvent with broad application in organic chemistry, ChemSusChem, 5(8), 1369-1379 (Year: 2012).*
The English translation of the International Search Report, dated Mar. 30, 2020, in the corresponding PCT Appl No. PCT/FR2019/053125.
Anne-Gaelle Sicaire et al. "2-Methyltetrahydrofuran: Main Properties, Production Processes, and Application in Extraction of Natural Products" In: Alternative Solvents for Natural Products Extraction, Berlin, Heidelberg, : Springer Berlin Heidelberg , pp. 253-268, Jan. 1, 2014 (Jan. 1, 2014), XP055627425.
Thitiphan Chimsook. "Microwave Assisted Extraction of Avocado Oil from Avocado Skin and Encapsulation Using Spray Drying" Key Engineering Materials, vol. 737, Jun. 1, 2017 (Jun. 1, 2017), pp. 341-346, XP055627329.
Sahar Ben-Youssef et al. "Green extraction procedures of lipids from Tunisian date palm seeds" Industrial Crops and Products., NL, vol. 108, Dec. 1, 2017 (Dec. 1, 2017), pp. 520-525, XP055627300.
Anne-Gaelle Sicaire. "Solvants alternatifs et techniques innovantes pour l'eco-extraction des huiles vegetales a partir de graines oleagineuses" Jul. 8, 2016 (Jul. 8, 2016), Retrieved from the Internet: http://www.sfel.asso.fr/fichiers/pdf/workshop-2018/solvants-ags-sfel-041218.pdf, XP055627422 p. 21-p. 27.
Anne-Gaelle Sicaire et al. "Alternative Bio-Based Solvents for Extraction of Fat and Oils: Solubility Prediction, Global Yield, Extraction Kinetics, Chemical Composition and Cost of Manufacturing" International Journal of Molecular Sciences, vol. 16, No. 12, Apr. 15, 2015 (Apr. 15, 2015), pp. 8430-8453, XP055627424.
The Canadian Office Action, dated Sep. 16, 2021, in the related Canadian Appl. No. 3,065,480.
Pennakem Renewable Resource Chemistry, "Bio-Based Solvents & Fine Chemicals," https://pennakem.com/core-business/bio-based-solvents-chemistry/, available on Nov. 23, 2018.
Sérgio S. de Jesus et al., "Laboratory extraction of microalgal lipids using sugarcane bagasse derived green solvents," Algal Research, 35, pp. 292-300, 2018.

* cited by examiner

*Primary Examiner* — Yate' K Cutliff

(57) ABSTRACT

The present invention relates to a process for producing an oil and a defatted cake by solid/liquid extraction. The process comprises a step of solid/liquid extraction using a solvent comprising 2-methyloxolane and water.

20 Claims, No Drawings

PROCESS FOR PRODUCING OILS AND DEFATTED MEAL BY MEANS OF SOLID/LIQUID EXTRACTION

CROSS-REFERENCE TO RELATED APPLICATIONS

This application is a National Stage Application of PCT/FR2019/053125 filed Dec. 17, 2019, which claims priority from French Patent Application No. 18 73103, filed on Dec. 17, 2018. The priority of said PCT and French Patent Application are claimed. Each of prior mentioned applications is hereby incorporated by reference herein in its entirety.

TECHNICAL FIELD

The invention relates to the field of the production of oils and defatted cakes from a biological substrate by a process of solid/liquid extraction.

CONTEXT OF THE INVENTION

Oils have an important place in the food, pharmaceutical, nutraceutical and cosmetic industry. Recently attention has been focused on the production of oils rich in polyphenols. In fact, according to recent studies, oils rich in polyphenols have beneficial effects on health, in particular on the skin and against cardiovascular diseases and cancers. Recent industrial developments have therefore concerned the production of oils rich in polyphenols.

Two broad categories of processes for producing oils are known: the mechanical process, which makes it possible to obtain a virgin oil, and the process by solid/liquid extraction, allowing an oil to be produced starting from a solid substrate. Conventionally, the process by solid/liquid extraction comprises a step of solid/liquid extraction employing a solvent to obtain a liquid fraction comprising an oil and the solvent.

The two processes, mechanical and by solid/liquid extraction, may be combined, namely a first mechanical process, followed by a solid/liquid extraction, the solid consisting of the solid residue resulting from the mechanical process.

The solid residues, also called cakes, are mainly used as animal feed, and increasingly in human nutrition, mainly as protein supplement, but also as a metabolizable energy source.

It is important for these cakes to be defatted, as this promotes their long-term storage (limitation of the risk of rancidity) and facilitates isolation of the proteins for animal nutrition. Moreover, fat upsets digestion in animals, in particular in bovines.

Currently, hexane is the solvent most used in the solid/liquid extraction process, as it has some advantageous properties. In fact, hexane allows high-yield extraction of the oil (>97%) and makes it possible to leave less than 3% of residual oil in the solid substrate, which prevents the latter becoming rancid. Hexane is easy to separate from the extracted oil, it has a suitable boiling point (i.e. high enough to limit losses during extraction but low enough to limit energy consumption during separation thereof with the extracted oil and during recycling thereof), it is stable and has good lipid selectivity.

However, hexane has important drawbacks. It is of petroleum origin, it is neurotoxic and is classified in category 2 of reproductive toxicity. It is also toxic for the aquatic environment, in category 2.

Moreover, analyses of oils obtained by solid/liquid extraction with hexane have demonstrated that the process using hexane does not allow a polyphenol-rich oil to be obtained.

Alternative solvents to hexane have been tested. For example, the article by Anne-Gaëlle Sicaire et al. "2-Methyltetrahydrofuran: Main Properties, Production Processes, and Application in Extraction of Natural Products" on pages 253-268 of "Alternative Solvents for Natural Products Extraction" describes solid/liquid extraction of blackcurrant buds with anhydrous 2-methyloxolane for obtaining dyes and flavorings.

The present invention therefore aims to supply an industrial process of solid/liquid extraction that makes it possible to produce a polyphenol-rich crude oil and/or a defatted cake.

Surprisingly, the applicant has developed a process that meets this need.

DISCLOSURE OF THE INVENTION

According to a first aspect, the invention relates to a process for producing a polyphenol-rich crude oil from a biological substrate comprising a step of:

a) solid/liquid extraction of the biological substrate with a solvent to obtain on the one hand a liquid fraction comprising the crude oil and the solvent and on the other hand a solid residue, characterized in that, the solvent comprises 2-methyloxolane and water, and the percentage of water by weight in the solvent in the extraction step a) is from 0.3% to 20%.

In the sense of the present invention, "solid/liquid extraction" means obtaining a liquid fraction and a solid residue from a solid biological substrate using a liquid solvent as the extraction solvent. Typically solid/liquid extraction may be carried out by decoction, infusion, digestion, percolation, lixiviation or maceration. A step of liquid/liquid extraction is not a step of solid/liquid extraction in the sense of the present invention as it does not use a solid biological substrate; moreover, the physicochemical characteristics involved in a step of solid/liquid extraction and in a step of liquid/liquid extraction are different.

In the sense of the present invention, "crude oil" means an unrefined oil, i.e. which has not undergone a step of chemical refining or mechanical refining, also called physical refining, after its extraction by a solid/liquid process.

Advantageously, the process according to the invention makes it possible to produce a crude oil richer in polyphenol than the crude oil produced by the processes using hexane or anhydrous 2-methyloxolane.

In the sense of the present invention, "polyphenol-rich crude oil" means a crude oil comprising one or more polyphenols and whose concentration of polyphenols by weight is greater than or equal to 100 ppm, in particular from 320 ppm to 2000 ppm, more particularly from 350 ppm to 1500 ppm, even more particularly from 400 ppm to 1200 ppm.

In the sense of the present invention, "polyphenol" means a class of molecules characterized by the presence of several phenol groups arranged in complex structures.

The crude oil may also comprise a tocopherol.

Tocopherols have antioxidant properties that make it possible to protect, advantageously, the crude oil against oxidation and therefore rancidity. Moreover, tocopherols have beneficial health effects, in particular in prevention against cardiovascular diseases. Crude oil comprising a tocopherol may therefore have beneficial health effects, in particular in prevention against cardiovascular diseases.

The concentration of tocopherol by weight in the crude oil may be above or equal to 350 ppm, in particular from 825 ppm to 10000 ppm, more particularly from 1500 ppm to 5000 ppm, even more particularly from 2000 ppm to 3000 ppm. For one and the same biological substrate, this concentration of tocopherol by weight is greater than the concentration of tocopherol by weight in a crude oil produced by processes using hexane or anhydrous 2-methyloxolane.

According to a very particular embodiment, the concentration of tocopherol by weight in the crude oil may be above or equal to 350 ppm, in particular from 825 ppm to 10000 ppm, more particularly from 1500 ppm to 5000 ppm, even more particularly from 2000 ppm to 3000 ppm, with the exception of the crude oil produced from a biological substrate being colza that may present a concentration of tocopherol by weight from 825 ppm to 10000 ppm, more particularly from 1500 ppm to 5000 ppm, even more particularly from 2000 ppm to 3000 ppm.

The crude oil may also comprise 2-methyloxolane.

Typically the concentration of 2-methyloxolane by weight in the crude oil may be from 0.5 ppm to 500 ppm, in particular from 50 ppm to 300 ppm.

The process according to the invention employs a solvent comprising 2-methyloxolane (CAS No. 96-47-9) and water. Advantageously, 2-methyloxolane is not classified as toxic for the environment and is of biosourced origin as its raw material is typically derived from sugar cane bagasse or from maize cobs. Moreover, 2-methyloxolane is not toxic in ingestion for the amounts envisaged. In fact, a published test of 3 months of ingestion in rats showed a dose with Non Observed Adverse Effect Limit (NOAEL) of 250 mg/kg body weight/day against 23 mg/kg body weight/day for hexane (Parris et al. Regulatory Toxicology and Pharmacology 87 (2017) 54-63 and Notice of the European Scientific Committee for Food published on 17 Jun. 1994).

According to a particular embodiment, the percentage of water by weight in the solvent is from 1% to 15%, more particularly from 4% to 6% in the extraction step a).

In the sense of the present invention, "the percentage of water by weight in the solvent" corresponds to the weight of water in the solvent divided by the total weight of the solvent at the inlet of the extractor in which the extraction step a) is carried out. Typically, the percentage of water by weight in the solvent may be determined by the Karl Fischer method.

Under certain conditions, in particular in the ranges of percentage of water by weight in the solvent indicated above, 2-methyloxolane and water can form homogeneous liquid mixtures.

In fact an azeotrope comprising 89.4 wt % of 2-methyloxolane and 10.6 wt % of water forms at 71° C. Moreover, water is partially soluble in 2-methyloxolane, the solubility of water in 2-methyloxolane being 4.1 wt % at 20° C. and 4.6 wt % at 60° C.

Advantageously, the process according to the invention is easier to carry out when the solvent is a homogeneous liquid mixture than when the solvent is a two-phase liquid mixture. This is typically the case for the extraction step a) of the process according to the invention.

In the sense of the present invention, "biological substrate" means a solid material selected from a plant, an alga, a microorganism and mixtures thereof, in particular a plant.

When the biological substrate is a plant, the crude oil obtained by the process according to the invention is called crude vegetable oil.

For example the plant may be an oilseed, a protein crop or a mixture thereof.

As oilseeds, we may mention colza, sunflower, soybean, peanut, sesame, walnut, almond, cotton, flax or mixtures thereof, in particular colza, sunflower, soybean or mixtures thereof.

Examples of protein crop are peas, beans, lupins and a mixture thereof.

Typically the biological substrate may be a plant selected from almond, amaranth, peanut, argan, sea buckthorn, cashew tree, avocado, oat, borage, safflower, camelina, carrot, cocoa, cashew, hemp, colza, copra, cucurbit, cotton, croton, rosehip, fig, prickly pear, pomegranate, hop, illipé, jojoba, karite, flax, lupine, maize, hazel, walnut, coconut palm, poppy, olive, evening primrose, cabbage palm, paprika, pecan, pistachio, pepper, castor-oil plant, rice, musk rose bush, sesame, soybean, marigold, sunflower, *Calophyllum inophyllum*, madhuca, Queensland walnut, raspberry, blackcurrant, melon, grape, tomato, baobab, babassu, cranberry, chia, pumpkin, mustard, neem, *Nigella sativa*, niger, poppy, Perilla, *Plukenetia volubilis*, pumpkin, annatto, Taramira, apricot, plum, peach, wheat, in particular soybean, colza, sunflower, baobab, maize, peanut, coconut palm, cabbage palm, cotton, more particularly soybean, colza, sunflower, baobab and mixtures thereof.

In the case when the biological substrate is a plant, the extraction step a) may be carried out starting from the whole plant or from one or more parts of the plant, and in particular a part selected from root, stem, bark, flower, seed, germ, leaf, bran, fruit, nut, pips, stone.

A person skilled in the art will know which part to select, depending on the plant.

Typically the biological substrate may be selected from oat bran, raspberry pips, blackcurrant pips, pomegranate pips, melon pips, grape pips, tomato pips, baobab seeds, babassu seeds, cranberry seeds, chia seeds, maize seeds, cotton seeds, peanut seeds, colza seeds, cucurbit seeds, madhuca seeds, mustard seeds, neem seeds, *Nigella sativa* seeds, niger seeds, poppy seeds, Perilla seeds, *Plukenetia volubilis* seeds, pumpkin seeds, annatto seeds, rice bran, soybeans, Taramira seeds, sunflower seeds, apricot stones, plum stones, peach stones, *Calophyllum inophyllum* fruit, walnut, cashew nut, macadamia nut, coconut, pecan nut, in particular soybeans, colza seeds, sunflower seeds, baobab seeds and mixtures thereof.

According to a quite particular embodiment, the biological substrate is selected from soybeans, colza seeds, sunflower seeds and mixtures thereof.

When the biological substrate is an alga, it may be selected from the genera *Arthrospira, Haematococcus, Dunaliella, Chlorella, Nannochloropsis, Schizochytrium, Crypthecodinium, Culindrotheca, Isochrysis, Nannochloris, Nitzchia, Phaeodactylum, Chaetoceros* and mixtures thereof.

When the biological substrate is a microorganism, it may be selected from a yeast, a mold, a bacterium, a fungus or a mixture thereof. The yeast may typically be selected from the genera *Cryptococcus, Candida, Lipomyces, Rhodotorula, Saccharomyces, Trichosporon, Yarrowia* and mixtures thereof.

Typically, the biological substrate may have undergone a preliminary step of preparation, before the extraction step a). This step of preparation may be, for example, flattening also called flaking to obtain flakes, grinding, mechanical extraction to obtain scales, pressing, centrifugation, cooking, lyophilization, an enzymatic lysis, mechanical lysis, maceration, trituration to obtain a cake, ultrasound treatment, microwave treatment, drying or mixtures thereof or any combination of said preparations.

The extraction step a) may typically be carried out in batch mode or continuously.

When the extraction step a) is carried out in batch mode, the biological substrate and the solvent are advantageously mixed in an extractor, such as a fixed-bed extractor or a dispersed-charge extractor. When the extraction step a) is carried out in batch mode, the weight ratio of biological substrate to solvent may be from 1:1 to 1:50, in particular from 1:2 to 1:20, more particularly from 1:5 to 1:10.

When the extraction step a) is carried out continuously, the biological substrate is fed continuously into a moving bed extractor, such as extractors with moving compartments, with moving baskets, with a conveyor chain or conveyor belt. The solvent is brought into contact with the biological substrate by circulation or percolation, typically in counter-current with the biological substrate. When the extraction step a) is carried out continuously the weight ratio of biological substrate to solvent may advantageously be from 1:0.5 to 1:5, in particular from 1:0.75 to 1:3, more particularly from 1:1 to 1:1.3.

Typically the extraction step a) is advantageously carried out at a temperature from 20° C. to 100° C., in particular from 40° C. to 80° C., more particularly from 55° C. to 75° C. Advantageously, the extraction step a) is facilitated in these temperature ranges as they are compatible with the boiling point of the 2-methyloxolane/water azeotrope, which is 71° C.

According to one embodiment, the process according to the invention may further comprise a recovery step b) of the liquid fraction comprising the crude oil and the solvent.

Typically, the process according to the invention may comprise, in addition to the extraction step a), the following steps:

b) recovering the liquid fraction comprising the crude oil and the solvent, and c) separating the crude oil and the solvent from the liquid fraction to recover on the one hand the crude oil and on the other hand the solvent.

The recovery step b) of the liquid fraction makes it possible to separate the liquid fraction from the solid residue. Typically this step b) may be carried out by filtration.

The separation step c) may be carried out by liquid/liquid extraction, by steam distillation, by heating, by distillation or combinations thereof, in particular by steam distillation, by distillation or a combination thereof, quite particularly by distillation.

Typically the separation step c) may be carried out in batch mode or continuously.

Steps b) and c) are conventional steps of the processes for producing oils by solid/liquid extraction. A person skilled in the art will be able to adapt the operating conditions of these steps for carrying them out.

Typically, the process according to the invention may comprise, after step c), a step d) of recycling all or part of the solvent recovered at the end of step c) to the extraction step a).

Advantageously, recycling the solvent recovered at the end of step c) makes it possible to decrease the economic cost in raw materials of the process according to the invention and therefore improve its industrial viability.

According to a first variant, all or part of the solvent recovered at the end of step c) undergoes, before the recycling step d), a step d') of reducing the percentage of water by weight. This first variant is particularly advantageous when the percentage of water by weight in the solvent recovered at the end of step c) is greater than 20%, in particular greater than 15%, quite particularly greater than 6%.

According to a second variant, all or part of the solvent recovered at the end of step c) is recycled directly to the extraction step a) in the recycling step d). Thus, in this second variant, the process does not comprise, between step c) and step d), a step d') of reducing the percentage of water by weight. This second variant is particularly advantageous when the percentage of water by weight in the solvent recovered at the end of step c) is from 0.3% to 20%, in particular from 1% to 15%, more particularly from 4% to 6%.

According to one embodiment, step d') of reducing the percentage of water by weight may be carried out by condensation, by decanting, by distillation or combinations thereof, in particular by condensation, by decanting or a combination thereof, more particularly by decanting followed by distillation.

To facilitate solvent recycling, it may be advantageous to form the azeotrope comprising 89.4 wt % of 2-methyloxolane and 10.6 wt % of water at 71° C. during condensation. In this case the percentage of water by weight in the solvent may be from 1% to 25%, in particular from 5% to 20% and more particularly from 10% to 12% after condensation. It may also be advantageous to solubilize water in 2-methyloxolane directly during condensation or optional decanting, the solubility of water in 2-methyloxolane being 4.1% at 20° C. and 4.6% at 60° C. In this case the percentage of water by weight in the solvent may be from 0.3% to 20%, in particular from 1% to 15%, more particularly from 4% to 6% after condensation or optional decanting.

A person skilled in the art will be able to adapt the operating conditions of the condensation to form the azeotrope and/or solubilize water in 2-methyloxolane.

A person skilled in the art will also be able to adapt the operating conditions of the optional decanting for solubilizing water in 2-methyloxolane.

According to a specific embodiment, step d') of reducing the percentage of water by weight may be carried out by condensation followed by decanting and:

the percentage of water by weight in the solvent after condensation is from 1% to 25%, in particular from 5% to 20% and more particularly from 10% to 12%, and the percentage of water by weight in the solvent after decanting is from 0.3% to 20%, in particular from 1% to 15%, more particularly from 4% to 6%.

The crude oil may comprise impurities such as gums, waxes, free fatty acids, pigments, metallic traces, volatile odorous compounds and mixtures thereof. The crude oil may therefore undergo a refining step to remove at least one of these impurities from the crude oil and recover a refined oil. Advantageously, this refined oil may be suitable, for example, for use in food, for cosmetic use, for pharmaceutical use and/or for industrial use.

One embodiment of the invention is a process for producing a refined oil comprising a step of refining the crude oil recovered in step c) of the process for producing a crude oil according to the invention.

The refined oil produced by the process for producing a refined oil according to the invention may comprise a tocopherol. Advantageously, a refined oil comprising a tocopherol may have beneficial health effects.

The concentration of tocopherol by weight in the refined oil may be above or equal to 350 ppm, in particular from 825 ppm to 10000 ppm, more particularly from 1500 ppm to 5000 ppm, even more particularly from 2000 ppm to 3000 ppm. For one and the same biological substrate, this concentration by weight is greater than the concentration of tocopherol by weight in a refined oil produced by processes using hexane or anhydrous 2-methyloxolane.

According to a very particular embodiment, the concentration of tocopherol by weight in the refined oil may be above or equal to 350 ppm, in particular from 825 ppm to 10000 ppm, more particularly from 1500 ppm to 5000 ppm, even more particularly from 2000 ppm to 3000 ppm, with the exception of the refined oil produced from a biological substrate being colza that may present a concentration of tocopherol by weight from 825 ppm to 10000 ppm, more particularly from 1500 ppm to 5000 ppm, even more particularly from 2000 ppm to 3000 ppm.

The refined oil produced by the process for producing a refined oil according to the invention may comprise 2-methyloxolane.

The concentration of 2-methyloxolane by weight in the crude oil decreases during the refining step. Thus, the concentration of 2-methyloxolane by weight in the refined oil is very low. Typically, the concentration of 2-methyloxolane by weight in the refined oil may be less than or equal to 5 ppm, in particular from 0.01 ppm to 3 ppm, more particularly from 0.1 ppm to 1 ppm.

Advantageously, the refined oil produced by the process for producing a refined oil according to the invention does not comprise hexane. Thus, this refined oil is safer than a refined oil obtained by a conventional process using hexane because, in contrast to 2-methyloxolane, hexane is neurotoxic and is classified in category 2 for reproductive toxicity.

A refined oil whose concentration of 2-methyloxolane by weight is above 5 ppm has degraded organoleptic properties. The refined oil produced by the process for producing a refined oil according to the invention therefore advantageously has satisfactory organoleptic properties.

According to one embodiment, the refining step may be a step of chemical refining and/or a step of physical refining.

The step of chemical refining may comprise at least one of the following substeps:
  degumming to remove and recover the gums, also called lecithins,
  basic chemical neutralization, in particular with soda, to remove the free fatty acids,
  bleaching to remove the pigments and recover a decolored oil, and
  deodorizing to remove the volatile odorous compounds and recover a distillate.

The step of physical refining may comprise at least one of the following substeps:
  degumming to remove and recover the gums, also called lecithins,
  bleaching to remove the pigments and recover a decolored oil, and
  distillation, in particular vacuum distillation with steam injection, to remove the volatile odorous compounds and the free fatty acids, recovered in the form of distillate.

These substeps of chemical refining and of physical refining are conventional substeps of processes for producing refined oils by solid/liquid extraction. A person skilled in the art will be able to adapt the operating conditions of these substeps for carrying them out.

Advantageously, the lecithins recovered in the degumming substep and the distillate recovered in the distillation step comprise polyphenols. They are therefore beneficial for health.

The lecithins recovered in the degumming substep may notably be used as emulsifiers.

The distillate recovered in the distillation step may for example be used in a pharmaceutical, nutraceutical or cosmetic composition. It may also be used as a food supplement.

The process according to the invention also makes it possible to produce a solid residue.

According to a second aspect, the invention relates to a process for producing a solid residue comprising a step e) of recovery of the solid residue obtained in step a) of solid/liquid extraction of the process for producing a polyphenol-rich crude oil according to the invention.

In the sense of the present invention, "solid residue" means the defatted solid produced by the process for producing a solid residue according to the invention starting from the biological substrate. The solid residue is also called cake.

The process according to the invention makes it possible to produce a polyphenol-rich crude oil starting from the biological substrate; the solid residue is therefore depleted of polyphenol.

The concentration of polyphenol by weight in the solid residue produced by the process for producing a solid residue according to the invention is lower than the concentration of polyphenols by weight in a solid residue produced by a conventional process using hexane.

The solid residue produced by the process for producing a solid residue according to the invention comprises a polyphenol and a residual oil, the concentration of polyphenol by weight in said solid residue being less than or equal to 3000 ppm, in particular from 10 ppm to 1500 ppm, more particularly from 50 ppm to 500 ppm and the concentration of residual oil by weight in said solid residue being less than or equal to 5%, in particular from 0.1% to 3%, more particularly from 0.3% to 2%.

Advantageously, by having a concentration of polyphenols by weight in these ranges of values, it is possible to decrease, or even avoid, organoleptic problems, such as the appearance of a dark coloration and/or of bitterness, in the flours, protein isolates and protein concentrates derived from these solid residues.

Moreover, for one and the same biological substrate, the solid residue produced by the process for producing a solid residue according to the invention advantageously has a lower concentration of residual oil by weight than a solid residue produced by a conventional process using hexane or a process using anhydrous 2-methyloxolane.

In the sense of the present invention, a "residual oil" comprised in the solid residue is an oil extracted by the process described in standard NF EN ISO 734: February 2016.

Step e) of recovery of the solid residue makes it possible to separate the liquid fraction from the solid residue. Typically this step e) may be carried out by filtration.

The solid residue may comprise solvent of the process according to the invention, in particular 2-methyloxolane. The solid residue may therefore undergo a step f) of desolvation after step e) for recovering on the one hand the solvent and on the other hand a desolvated solid residue.

Thus, another embodiment of the invention is a process for producing a desolvated solid residue comprising a step f) of desolvation of the solid residue recovered in step e) of the process for producing the solid residue according to the invention for recovering on the one hand the solvent and on the other hand the desolvated solid residue.

According to one embodiment, the desolvation step f) may be carried out by heating the solid residue and then injecting vapor into the heated solid residue, optionally accompanied by vacuuming.

For example, the vapor may be vapor of the solvent according to the invention, superheated vapor of the solvent according to the invention, vapor of anhydrous 2-methyloxolane, superheated vapor of anhydrous 2-methyloxolane, steam, superheated steam and mixtures thereof, in particular superheated vapor of the solvent according to the invention or superheated vapor of anhydrous 2-methyloxolane, more particularly superheated vapor of the solvent according to the invention.

Conventionally, a desolvation step lowers the concentration of 2-methyloxolane by weight present in the solid residue. Thus, the desolvated solid residue comprises 2-methyloxolane and the concentration of 2-methyloxolane by weight may typically be below 1000 ppm, in particular from 10 ppm to 500 ppm, quite particularly from 100 ppm to 300 ppm.

Typically the concentration of residual oil by weight in the desolvated solid residue is less than or equal to 5%, in particular from 0.1% to 3%, more particularly from 0.3% to 2%.

According to one embodiment, the solid residue may undergo a step of pretreatment before the desolvation step f) such as an additional moistening for adjusting the water content of the solid residue. Advantageously this step of additional moistening may facilitate desolvation of the solid residue. A person skilled in the art will be able to adapt this step of additional moistening as a function of the desired water content of the solid residue.

The desolvated solid residue may then be transformed into a byproduct intended for example as animal feed or for human nutrition.

Another embodiment of the invention is therefore a process for producing a byproduct comprising a step g) of transforming the desolvated solid residue recovered in step f) of the process for producing a desolvated solid residue according to the invention to produce the byproduct.

Advantageously, the byproduct produced by the process for producing a byproduct according to the invention is particularly suitable for feeding animals, in particular bovines. In fact it is defatted, as it is obtained from the solid residue, and does not upset digestion in animals, in particular bovines. Moreover, this byproduct is safer than a byproduct obtained by a conventional process using hexane because, in contrast to 2-methyloxolane, hexane is neurotoxic and is classified in category 2 for reproductive toxicity.

According to one embodiment, the byproduct may be selected from a flour, a protein concentrate, protein isolate, a textured protein and mixtures thereof.

In the sense of the present invention, "flour" means the byproduct resulting from grinding, milling or pulverizing the solid residue in order to obtain a powder therefrom.

In the sense of the present invention, "protein concentrate" means a byproduct derived from treatment of the solid residue by solid-liquid extraction so as to remove the sugars and the antinutritional factors, so as to obtain a solid fraction containing about 60 to 70% of proteins.

In the sense of the present invention, "protein isolate" means a byproduct derived from treatment of the solid residue in an aqueous medium via a succession of steps so as to obtain a solid fraction containing about 90% of proteins.

In the sense of the present invention, "textured protein" means a byproduct derived from treatment of a flour or of a protein concentrate by extrusion.

According to one embodiment, step g) of transformation may be selected from a grinding step, a step of solid-liquid extraction, a step of solubilizing the proteins, a step of precipitation of the proteins, a step of centrifugation, a step of extrusion, a step of modification of the proteins, a step of functionalization of the proteins, or mixtures thereof.

A person skilled in the art will be able to select and adapt step g) of transformation as a function of the byproduct that he wishes to obtain.

For example, to produce a flour, step g) of transformation may be a grinding step.

For example, to produce a protein concentrate, step g) of transformation may be a step of solid-liquid extraction using a water-alcohol mixture.

For example, to produce a protein isolate, step g) of transformation may be a succession of steps of solubilization and precipitation of the proteins at specific pH values for selective removal of the sugars and fibers initially present in the solid residue.

For example, to produce a textured protein, step g) of transformation may be a step of extrusion starting from a flour or a protein concentrate.

Step g) of transformation may reduce the concentration of 2-methyloxolane by weight. Thus, the byproduct comprises 2-methyloxolane and the concentration of 2-methyloxolane by weight is below 1000 ppm, in particular below 500 ppm, quite particularly from 0.5 ppm to 50 ppm.

The concentration of 2-methyloxolane by weight in the byproduct may depend on the byproduct.

For example, the concentration of 2-methyloxolane by weight in the flour may be below 1000 ppm, in particular below 500 ppm, quite particularly from 5 ppm to 50 ppm.

The concentration of 2-methyloxolane by weight in the protein concentrate, in the protein isolate or in the textured protein may typically be below 30 ppm, in particular from 0.5 ppm to 20 ppm, quite particularly from 8 ppm to 12 ppm.

Typically the concentration of residual oil by weight in the byproduct is less than or equal to 5%, in particular from 0.1% to 3%, more particularly from 0.3% to 2%.

According to one embodiment, the process according to the invention may further comprise a step h) of recycling all or part of the solvent recovered in step f) of desolvation, to the extraction step a).

Advantageously, recycling the solvent recovered in step f) of desolvation makes it possible to lower the economic cost in raw material of the process according to the invention and therefore improve its industrial viability.

According to a first variant, all or part of the solvent recovered at the end of step f) of desolvation undergoes, before the recycling step h), a step h') of reducing the percentage of water by weight. This first variant is particularly advantageous when the percentage of water by weight in the solvent recovered at the end of the desolvation step f) is greater than 20%, in particular greater than 15%, quite particularly greater than 6%.

According to a second variant, all or part of the solvent recovered at the end of the desolvation step f) is recycled directly to the extraction step a) in the recycling step h). Thus, in this second variant, the process does not comprise, between the desolvation step f) and the recycling step h), a step h') of reducing the percentage of water by weight. This second variant is particularly advantageous when the percentage of water by weight in the solvent recovered at the end of the desolvation step f) is from 0.3% to 20%, in particular from 1% to 15%, more particularly from 4% to 6%.

Step h') of reducing the percentage of water by weight is carried out in the same conditions as step d') of reducing the percentage of water by weight.

According to a particular embodiment, all or part of the solvents recovered in steps c) and f) may be mixed and some or all of the mixture may be recycled to the extraction step a) in a recycling step i).

According to a first variant, all or part of the solvents recovered in steps c) and f) may be mixed and some or all of the mixture may undergo a step i') of reducing the percentage of water by weight before being recycled to the extraction step a) in a recycling step i).

According to a second variant, all or part of the solvents recovered in steps c) and f) may be mixed and some or all of the mixture may be directly recycled to the extraction step a) in a recycling step i). Thus, in this second variant, the process does not comprise, between steps c) and f) and step i), a step i') of reducing the percentage of water by weight.

Step i') of reducing the percentage of water by weight is carried out in the same conditions as step d') of reducing the percentage of water by weight.

According to a quite particular embodiment, the process for producing a crude oil according to the invention comprises the following steps:

a) solid/liquid extraction of the biological substrate with the solvent to obtain on the one hand a liquid fraction comprising the crude oil and the solvent and on the other hand a solid residue, b) recovering the liquid fraction comprising the crude oil and the solvent, c) separating the crude oil and the solvent from the liquid fraction by steam distillation to recover on the one hand the crude oil and on the other hand the solvent, and d) recycling, to step a), all or part of the solvent recovered in step c) after a step d') of reducing the percentage of water by weight in all or part of the solvent recovered at the end of step c) by condensation followed by decanting and:

the percentage of water by weight in the solvent after condensation is from 1% to 25%, in particular from 5% to 20% and more particularly from 10% to 12%, and the percentage of water by weight in the solvent after decanting is from 0.3% to 20%, in particular from 1% to 15%, more particularly from 4% to 6%.

According to a quite particular embodiment, the process for producing a desolvated solid residue according to the invention comprises the following steps:

a) solid/liquid extraction of the biological substrate with the solvent to obtain on the one hand a liquid fraction comprising the crude oil and the solvent and on the other hand a solid residue, b) separating the liquid fraction and the solid residue, e) recovering the solid residue, f) desolvating the solid residue recovered in step e) to obtain on the one hand the solvent and on the other hand the desolvated solid residue, h) recycling all or part of the solvent recovered in step f), to step a).

According to a quite particular embodiment, the process for producing a byproduct according to the invention comprises the following steps:

a) solid/liquid extraction of the biological substrate with the solvent to obtain on the one hand a liquid fraction comprising the crude oil and the solvent and on the other hand a solid residue, b) separating the liquid fraction and the solid residue, e) recovering the solid residue, f) desolvating the solid residue recovered in step e) to obtain on the one hand the solvent and on the other hand the desolvated solid residue, g) transforming the desolvated solid residue recovered in step f) to produce a byproduct, and h) recycling all or part of the solvent recovered in step f), to step a).

As explained above, the process for producing a crude oil according to the invention makes it possible to produce a crude oil advantageously rich in polyphenol and which may comprise 2-methyloxolane.

Thus, the invention also relates to a polyphenol-rich crude oil derived from a biological substrate, said crude oil comprising one or more polyphenols, 2-methyloxolane, and being characterized in that the concentration of polyphenol by weight is greater than or equal to 100 ppm, in particular said crude oil is obtainable by the process for producing a crude oil according to the invention.

In the sense of the present invention, "polyphenol-rich crude oil" means a crude oil comprising one or more polyphenols and whose concentration of polyphenol by weight is greater than or equal to 100 ppm, in particular from 320 ppm to 2000 ppm, more particularly from 350 ppm to 1500 ppm, even more particularly from 400 ppm to 1200 ppm.

Typically, the concentration of 2-methyloxolane by weight in the crude oil may be from 0.5 ppm to 500 ppm, in particular from 50 ppm to 300 ppm.

The crude oil may also comprise a tocopherol.

The concentration of tocopherol by weight in the crude oil may be greater than or equal to 350 ppm, in particular from 825 ppm to 10000 ppm, more particularly from 1500 ppm to 5000 ppm, even more particularly from 2000 ppm to 3000 ppm. For one and the same biological substrate, this concentration of tocopherol by weight is greater than the concentration of tocopherol by weight in a crude oil produced by processes using hexane or anhydrous 2-methyloxolane.

According to a very particular embodiment, the concentration of tocopherol by weight in the crude oil may be above or equal to 350 ppm, in particular from 825 ppm to 10000 ppm, more particularly from 1500 ppm to 5000 ppm, even more particularly from 2000 ppm to 3000 ppm, with the exception of the crude oil produced from a biological substrate being colza that may present a concentration of tocopherol by weight from 825 ppm to 10000 ppm, more particularly from 1500 ppm to 5000 ppm, even more particularly from 2000 ppm to 3000 ppm.

The biological substrate is as described above in connection with the process for producing a crude oil according to the invention.

The crude oil may advantageously be beneficial for health as it is rich in polyphenol and may comprise a tocopherol. Advantageously, the crude oil may be suitable for example for use in food, for cosmetic use, for pharmaceutical use and/or industrial use.

Thus, the present invention relates to the use of this crude oil for preparing a composition such as a food composition, a cosmetic composition and a pharmaceutical composition.

As explained above, the process for producing a refined oil according to one embodiment of the invention advantageously makes it possible to produce a refined oil comprising a tocopherol in such a way that this refined oil may have beneficial health effects.

Thus, the invention relates to a refined oil derived from a biological substrate comprising a tocopherol, the concentration of tocopherol by weight in the refined oil being greater than or equal to 500 ppm, in particular said refined oil is obtainable by the process for producing a refined oil according to one embodiment of the invention.

Typically, the concentration of tocopherol by weight in the refined oil may be greater than or equal to 350 ppm, in particular from 825 ppm to 10000 ppm, more particularly from 1500 ppm to 5000 ppm, even more particularly from 2000 ppm to 3000 ppm. For one and the same biological substrate, this concentration of tocopherol by weight is greater than the concentration of tocopherol by weight in a refined oil produced by processes using hexane or anhydrous 2-methyloxolane.

According to a very particular embodiment, the concentration of tocopherol by weight in the refined oil may be above or equal to 350 ppm, in particular from 825 ppm to 10000 ppm, more particularly from 1500 ppm to 5000 ppm, even more particularly from 2000 ppm to 3000 ppm, with the exception of the refined oil produced from a biological substrate being colza that may present a concentration of tocopherol by weight from 825 ppm to 10000 ppm, more particularly from 1500 ppm to 5000 ppm, even more particularly from 2000 ppm to 3000 ppm.

The refined oil of the invention may also comprise 2-methyloxolane. This refined oil is safer than a refined oil produced by a conventional process using hexane because, in contrast to 2-methyloxolane, hexane is neurotoxic and is classified in category 2 for reproductive toxicity.

According to one embodiment, the concentration of 2-methyloxolane by weight in the refined oil may be less than or equal to 5 ppm, in particular from 0.01 ppm to 3 ppm, more particularly from 0.1 ppm to 1 ppm.

A refined oil whose concentration of 2-methyloxolane by weight is above 5 ppm has degraded organoleptic properties. The refined oil according to the invention therefore advantageously has satisfactory organoleptic properties.

The biological substrate is as described above in connection with the process for producing a crude oil according to the invention.

The refined oil that comprises a tocopherol may advantageously be beneficial for health. Advantageously, the refined oil may be suitable for example for use in food, for cosmetic use, or pharmaceutical use.

Thus, the present invention relates to the use of this refined oil for preparing a composition such as a food composition, a cosmetic composition and a pharmaceutical composition.

The process for producing a refined oil according to one embodiment of the invention also makes it possible to produce lecithins and/or a distillate comprising a polyphenol.

Thus, the invention relates to lecithins derived from a biological substrate comprising a polyphenol, in particular said lecithins are obtainable by the process for producing a refined oil according to one embodiment of the invention.

The biological substrate is as described above in connection with the process for producing a crude oil according to the invention.

Advantageously, the lecithins comprise polyphenols. They are therefore beneficial for health.

These lecithins may notably be used as emulsifiers.

Thus, the present invention relates to the use of these lecithins as emulsifiers.

The invention relates to a distillate derived from a biological substrate comprising a polyphenol, in particular said distillate is obtainable by the process for producing a refined oil according to one embodiment of the invention.

The biological substrate is as described above in connection with the process for producing a crude oil according to the invention.

The distillate may for example be used in a pharmaceutical, nutraceutical or cosmetic composition. It may also be used as a food supplement.

Thus, the present invention relates to the use of this distillate for preparing a composition such as a pharmaceutical composition, a nutraceutical composition or a cosmetic composition. The present invention relates to the use of this distillate as a food supplement.

As explained above, the process for producing a solid residue according to one embodiment of the invention advantageously makes it possible to produce a solid residue depleted of polyphenols and comprising a low concentration of residual oil by weight.

Thus, one embodiment of the invention is a solid residue derived from a biological substrate comprising a polyphenol and a residual oil, whose concentration of polyphenol by weight is less than or equal to 3000 ppm, in particular from 10 to 1500 ppm, more particularly from 50 to 500 ppm and whose concentration of residual oil by weight is less than or equal to 5%, in particular from 0.1% to 3%, more particularly from 0.3% to 2%, in particular said solid residue is obtainable by the process for producing a solid residue according to one embodiment of the invention.

Advantageously, by having a concentration of polyphenols by weight in these ranges of values it is possible to decrease, or even avoid, organoleptic problems, such as the appearance of a dark coloration and/or of bitterness, in the flours, protein isolates and protein concentrates derived from these solid residues.

The biological substrate is as described above in connection with the process for producing a crude oil according to the invention.

The residual oil comprised in the solid residue is as defined above in connection with the process for producing a solid residue.

According to one embodiment, the solid residue may also comprise 2-methyloxolane.

According to one embodiment, the solid residue does not comprise hexane.

The solid residue may then be transformed into a byproduct intended for example for animal feed or for human nutrition.

The present invention also relates to the use of this solid residue for preparing a food composition for animals or humans.

Advantageously, it is possible to produce a desolvated solid residue with the process for producing a desolvated solid residue described above.

Thus, one embodiment of the invention is a desolvated solid residue derived from a biological substrate comprising 2-methyloxolane and whose concentration of 2-methyloxolane by weight is below 1000 ppm, in particular from 10 ppm to 500 ppm, quite particularly from 100 ppm to 300 ppm, in particular said desolvated solid residue is obtainable by the process for producing a desolvated solid residue according to one embodiment of the invention.

Typically, the concentration of residual oil by weight in the desolvated solid residue is less than or equal to 5%, in particular from 0.1% to 3%, more particularly from 0.3% to 2%.

According to one embodiment, the desolvated solid residue does not comprise hexane.

The biological substrate is as described above in connection with the process for producing a crude oil according to the invention.

The desolvated solid residue may then be transformed into a byproduct intended for example for animal feed or for human nutrition.

The present invention also relates to the use of this desolvated solid residue for preparing a food composition for animals or humans.

Advantageously, it is also possible to produce a byproduct particularly suitable for nutrition, in particular animal nutrition with the process for producing a byproduct described above.

Thus, the invention also relates to a byproduct derived from a biological substrate comprising 2-methyloxolane and whose concentration of 2-methyloxolane by weight is below 1000 ppm, in particular below 500 ppm, quite particularly from 0.5 ppm to 50 ppm, in particular said byproduct is obtainable by the process for producing a byproduct according to one embodiment of the invention.

According to one embodiment, the byproduct may be selected from a flour, a protein concentrate, protein isolate, a textured protein, and mixtures thereof.

The concentration of 2-methyloxolane by weight in the byproduct may depend on the byproduct.

For example, the concentration of 2-methyloxolane by weight in flour may be below 1000 ppm, in particular below 500 ppm, quite particularly from 5 ppm to 50 ppm.

The concentration of 2-methyloxolane by weight in the protein concentrate, in the protein isolate or in the textured protein may typically be below 30 ppm, in particular from 5 ppm to 20 ppm, quite particularly from 8 ppm to 12 ppm.

Typically, the concentration of residual oil by weight in the byproduct is less than or equal to 5%, in particular from 0.1% to 3%, more particularly from 0.3% to 2%.

According to one embodiment, the byproduct does not comprise hexane.

The biological substrate is as described above in connection with the process for producing a crude oil according to the invention.

As the byproduct is particularly suitable for nutrition, in particular animal nutrition, the present invention also relates to the use of this byproduct for preparing a food composition, in particular a food composition for animals.

Typically, the concentration of polyphenols by weight in the crude oil, in the solid residue, in the lecithins and in the distillate is determined by the so-called "Folin Ciocalteu" method described by Slinkard and Singleton in the work "Total Phenol Analysis: Automation and Comparison with Manual Methods" which appeared in the review "American Journal of Enology and Viticulture 28, No. 1 (1 Jan. 1977): 49-55". A person skilled in the art knows how to adapt this method to the sample being analyzed and for application thereof on a 96-well microplate reader (FLUOstar Omega, BMG LABTECH, France).

Typically, the concentration of tocopherols by weight in the crude oil and in the refined oil is determined according to standard NF EN ISO 9936: June 2016.

The concentration of 2-methyloxolane by weight in the crude oil, the refined oil, the solid residue, the desolvated solid residue, the flour, the textured protein, the protein concentrate and the protein isolate is measured using a conventional analytical chemistry technique called "GC-Headspace" (gas chromatography with sampling from the head space). This analytical technique is known by a person skilled in the art to be suitable for analysis of volatile compounds contained in an oily matrix and in a solid matrix. The operating conditions depend on the sample, and a person skilled in the art will be able to adapt them to this sample.

For example, for a protein isolate the operating conditions are as follows: 0.50±0.01 g of sample to be analyzed is weighed in a 20-mL bottle, specially designed for the "HeadSpace" technique (23×77 mm), and then 7.0 mL of ultrapure water and 1.0 mL of DMF (N,N-dimethylformamide) are added to the bottle. The bottle is then sealed with a stopper equipped with a suitable septum. The bottle is then agitated vigorously for 30 seconds before analysis. The operating conditions of the step of sampling and injection into the head space are as follows: instrument=HeadSpace module 7697A; desorption=20 min at 100° C., transfer line temperature=160° C., injection loop temperature=130° C., injection volume=1 μL; helium pressure=12 PSI. The operating conditions of the step of chromatographic separation are as follows: instrument=GC 7890A (Agilent); column=DB624-60 m–320 μm–1.8 μm; liner=Agilent 5190-6168 (Ultralnert, splitless, straight, 2 mm id); injector temperature=250° C., nature and flow rate of the carrier gas=He, 1.3 mL/min; temperature profile of the furnace=60° C. (3 min)–ramp 5° C./min up to 70° C.–ramp at 10° C./min up to 220° C.–220° C. (2 min). The operating conditions of the detection step are as follows: type of detector=mass spectrometer (MS); ionization=EI, SIM mode (ions 56, 71 & 86 Da) for identification and total ionic current for quantification; temperature of the source=230° C.; temperature of the quadrupole=150° C. All the reagents, solvents and materials used are of appropriate analytical grade.

The concentration of 2-methyloxolane by weight in the sample of protein isolate analyzed is determined using a calibration curve constructed over a suitable range of concentrations of 2-methyloxolane by weight.

For the solid residue, the operating conditions are as follows: first of all the solid residue is ground in a ZM 200 centrifugal grinding mill (Retsch GmbH) equipped with a 0.2-mm sieve. Then 0.5±0.01 g of the ground sample to be analyzed is weighed in a 20-mL bottle, specially designed for the "HeadSpace" technique (23×77 mm). Then exactly 2.0 mL of water is added to the bottle before it is sealed with a stopper equipped with a septum. The bottle is left to stand for at least 5 min before analysis. The operating conditions of the step of sampling and injection into the head space are as follows: instrument="Turbomatrix HS40" (Perkin Elmer); desorption=60 min at 80° C.; transfer line temperature=120° C.;

needle temperature=110° C.; injection volume=0.2 mL; hydrogen pressure=20 PSI. The operating conditions of the step of chromatographic separation are as follows: instrument=Clarus 500 (Perkin Elmer); column=DB1-30 m–0.32 mm–3.0 μm; injector temperature=110° C., furnace temperature=40° C. (7 min, isothermal). The operating conditions of the detection step are as follows: type of detector=flame ionization detector (FID); detector temperature=250° C.; hydrogen pressure=20 PSI. All the reagents, solvents and materials used are of appropriate analytical grade.

A calibration straight line plotted beforehand makes it possible to determine the concentration of 2-methyloxolane by weight in the sample of solid residue analyzed, according to the following formula: $C_i = k_i * A_i$, where $C_i$ is the concentration of 2-methyloxolane by weight, $A_i$ is the area of the peak corresponding to 2-methyloxolane and is the slope of the calibration straight line for 2-methyloxolane.

The concentration of residual oil by weight in the solid residue is determined according to standard NF EN ISO 734: February 2016.

EXAMPLES

In the examples given below, the method for determining the concentration of polyphenols by weight in the crude oils is the so-called "Folin Ciocalteu" method, described by Slinkard and Singleton in the work "Total Phenol Analysis: Automation and Comparison with Manual Methods" which appeared in the review "American Journal of Enology and Viticulture 28, No. 1 (1 Jan. 1977): 49-55", with the modifications described below for using it on a 96-well microplate reader (FLUOstar Omega, BMG LABTECH, France).

All the reagents and solvents used are of appropriate analytical grade.

The polyphenols contained in the crude oil are extracted beforehand by the following method: 1 g of oil is diluted in 1 mL of hexane, and then the solution is extracted by 3 successive extractions with 3 mL of a methanol/water mixture (60 vol %/40 vol %). After each extraction, the 2 phases are stirred and then separated by centrifugation (10 000 rev·min$^{-1}$/10 min/20° C.) and the liquid water-alcohol phase is collected (any deposits, precipitates or solid particles potentially formed are not taken). The 3 water-alcohol phases are collected and then washed with 1 mL of hexane. The phases are separated by centrifugation and then the water-alcohol phase is transferred to a 10-mL graduated flask, and the volume is made up to the gauge mark with the methanol/water mixture (60 vol %/40 vol %).

Using a micropipette, 20 µL of this solution is put in a well of the microplate, to which 80 µL of aqueous solution of Na$_2$CO$_3$ (anhydrous, Acros Organics) at 75 g/L is added. The same mixing is repeated in 7 other wells, i.e. 8 wells in total for 1 sample of crude oil analyzed. Then 100 µL of Folin-Ciocalteu reagent (Panreac AppliChem, ref. 251567.1609), previously diluted to 1/10 (v/v) in distilled water, is added to each well automatically by the automatic injector of the microplate reader. Reading of the absorbance of each well is performed by the UV-Visible detector of the microplate reader at 750 nm, at 25° C. after agitation for 1 h in the dark in the apparatus. In parallel, a calibration curve was constructed using 8 aqueous solutions of gallic acid (Sigma-Aldrich) in a concentration range from 0 to 100 mg/L of gallic acid, according to the same analysis protocol defined for the samples, except that the solution comprising the phase and the methanol/water mixture is replaced with one of the 8 aqueous solutions of gallic acid.

Secondly, in order to remove the nonpolyphenolic compounds present in the oil, which may react with the Folin-Ciocalteu reagent (reducing sugars, proteins etc.), 5 mL of the solution of polyphenols obtained previously from the crude oil is acidified to pH=3.5 with 0.1 N HCl solution. Then 5 mL of distilled water and 1 g of polyvinylpolypyrrolidone (PVPP, particle size≈110 µm, Sigma-Aldrich) are added to this mixture in order to capture the polyphenols. The mixture is stirred mechanically for 10 min at 25° C. before being centrifuged at 10 000 rev·min$^{-1}$ for 10 min at 20° C. The supernatant is then taken and is then filtered using a filter-syringe (0.25 µm) before being analyzed according to the same protocol as the solution not treated with PVPP.

The absorbance value of this solution treated with PVPP will be used as the "blank"; it will be subtracted from the value obtained previously.

The absorbance value thus obtained, the mean value from absorbance measurement of 8 wells, from which the contribution of the nonpolyphenolic compounds is subtracted, serves for calculating the concentration of polyphenols by weight in the sample, from the equation of the calibration straight line. Taking into account the weight of oil used initially for the analysis, the concentration of polyphenols by weight in the sample is expressed in µg of gallic acid (abbreviated to EAG)/g of crude oil, or in an equivalent manner, in ppm.

In the examples given below, the method for determining the concentration of tocopherols by weight in the crude oils and in the refined oils is standard NF EN ISO 9936: June 2016.

In the examples given below, the method for determining the concentration of 2-methyloxolane by weight in the refined oil is applied using the conventional analytical chemistry technique called "GC-HeadSpace" (gas chromatography with sampling from the head space), according to the conditions described below. This analytical technique is known by a person skilled in the art to be suitable for analysis of volatile compounds contained in an oily matrix.

All the reagents, solvents and materials used are of appropriate analytical grade. Firstly, 5±0.01 g of refined oil to be analyzed is weighed in a 20-mL bottle, specially designed for the "HeadSpace" technique (23×77 mm). Then exactly 15 µL of a standard solution (heptane at 40% v/v in octane) is added to the 20-mL bottle before it is sealed with a stopper equipped with a septum. The 20-mL bottle is stirred vigorously (Vortex) for 5 min before analysis. The operating conditions of the step of sampling and injection into the head space are as follows: instrument="Turbomatrix HS40" (Perkin Elmer); desorption=60 min at 80° C., transfer line temperature=120° C., needle temperature=110° C.; injection volume=0.2 mL; hydrogen pressure=20 PSI. The operating conditions of the step of chromatographic separation are as follows: instrument=Clarus 500 (Perkin Elmer); column=DB1-30 m–0.32 mm–3.0 µm; injector temperature=150° C.; furnace temperature=40° C. (3 min) and then ramp of 10° C./min up to 110° C. (0 min). The operating conditions of the detection step are as follows: type of detector=flame ionization detector (FID); detector temperature=250° C., hydrogen pressure=11 PSI.

The concentration of 2-methyloxolane by weight in the sample of refined oil analyzed is determined from the following formula: $C_{MeOx}=a*(A_{MeOx}/A_{heptane})$ where $C_{MeOx}$ is the concentration of 2-methyloxolane by weight, $A_{MeOx}$ is the area of the peak corresponding to 2-methyloxolane, $A_{heptane}$ is the area of the peak corresponding to heptane (internal standard), and "a" is the slope of the calibration straight line for 2-methyloxolane established previously.

The calibration curve was plotted, according to the classical principles of analytical chemistry, by adding known amounts of a solution containing 2-methyloxolane and heptane, to a refined oil not containing 2-methyloxolane, so as to obtain concentrations of the oil by weight of 0.51, 1.02, 2.05, 5.12 and 10.25 µg/g.

Example 1 According to the Invention: The Solvent Comprises 2-Methyloxolane and Water Example 1-1: The Substrate is Soybean Crude soybean oil was extracted using an automatic extraction system of the Soxhlet type (Extraction System B-811, Büchi), from dehulled soybeans (Supplier: OLEAD, variety: ES PALLADOR, harvest: France, 2017, water content: 8.5%±0.3). The solvent used is a mixture of 2-methyloxolane (stabilized with BHT, Sigma Aldrich) containing 4.5 g of distilled water per 100 g of solvent.

About 50 g of soybeans are ground using a cutting mill so as to obtain particles smaller than 1 mm.

About 30 g of the powder obtained is weighed and put in a glass extraction cartridge suitable for the apparatus (Büchi). The cartridge is then put in the Soxhlet chamber and secured, in accordance with the instructions given in the user manual for the apparatus.

Then 170 mL of solvent is put in the 250-mL receiving beaker provided for this purpose. Then the apparatus is set to operate according to the "Standard Soxhlet" mode, without rinsing or desiccation, with a number of cycles fixed at 20 and a heating power fixed at 10.

Finally, the level detector is placed about 1 cm above the "high" level of the vegetable substrate and the condenser is supplied with cold water (8° C.).

The solvent is then brought to the boil by means of the integrated heating plate. At the end of the 20 cycles, all the solvent containing the extracted oil is collected in the receiving beaker, whereas the solid residue remains inside the extraction cartridge.

The solvent containing the extracted oil is left to cool for about 20 min at room temperature before being transferred to a 250-mL flask. The solvent is then evaporated using a rotary evaporator at reduced pressure (150 rev/min, 50° C.; 180 mbar, then 1 mbar to finish).

The crude oil thus obtained is weighed and then cooled under a light stream of nitrogen for 10 minutes before being transferred to a sealed tube and then stored in the freezer at −20° C. until the analyses.

The concentration of polyphenols by weight in the crude oil is presented in Table 1.

Example 1-2: The Substrate is Colza Seed

The operating protocol is the same as in example 1-1, except that the starting substrate is whole colza seed (supplier: OLEAD; provenance: Gironde (France); harvest: 2016; water content: 5.2%±0.15) and the Soxhlet extraction cartridges used are made of cellulose and not of glass.

The concentration of polyphenols by weight in the crude oil is presented in Table 1.

Example 1-3: The Substrate is Maize Seed

The operating protocol is the same as in example 1-1, except that the starting substrate is maize seed (supplier: Avignon University; provenance: France; water content=7.25%), the Soxhlet extraction cartridges used are made of cellulose and not of glass, the level of the sensor was fixed so that the volume of the extraction chamber is about 175 mL, the extraction time was fixed at 1 h without setting the number of cycles and the heating power was fixed at 12.

The concentration of polyphenols by weight in the crude oil is presented in Table 1.

Example 1-4: The Substrate is Cotton Seed

The operating protocol is the same as in example 1-3, except that the starting substrate is cotton seed (supplier: Avignon University; provenance: Turkey; water content=7.99%) and the seeds were ground beforehand and sieved so as only to recover the kernel, without the cotton fiber.

The concentration of polyphenols by weight in the crude oil is presented in Table 1.

Comparative Example 2: The Solvent is Hexane or Anhydrous 2-Methyloxolane

Comparative Example 2-1: Hexane

The operating protocol and the biological substrates are the same as in examples 1-1 and 1-4, except that the solvent is hexane.

The concentration of polyphenols by weight is presented in Table 1.

Comparative Example 2-2: Anhydrous 2-Methyloxolane

The operating protocol and the biological substrates are the same as in examples 1-1 and 1-4, except that the solvent is anhydrous 2-methyloxolane.

The concentration of polyphenols by weight is presented in Table 1.

The results in Table 1 show that the process according to the invention using a solvent comprising 2-methyloxolane and water makes it possible to produce an oil richer in polyphenol than the oil obtained with hexane (reference solvent) and with anhydrous 2-methyloxolane.

TABLE 1

| Biological substrate | Total polyphenols (µg gallic acid/g crude oil) | | |
| --- | --- | --- | --- |
| | 2-methyloxolane + water | anhydrous 2-methyloxane | Hexane |
| Soybean | 1138 | 309 | 25 |
| Colza | 386 | 128 | 13 |
| Maize | 516 | 303 | 10 |
| Cotton | 394 | 195 | 52 |

Example 3: Effect of the Concentration of Water by Weight in the Solvent

In this example, a crude oil is obtained by solid/liquid extraction starting from three different biological substrates with different solvents comprising 2-methyloxolane (stabilized with BHT, Sigma Aldrich) and distilled water, the percentage of water by weight in each solvent being 1%, 4.5%, 10% or 20%.

The three biological substrates are:
soybeans (supplier: OLEAD, variety: ES PALLADOR, harvest: France, 2017; water content: 8.5%±0.3),
colza seeds (supplier: OLEAD; provenance: Gironde (France); harvest: 2016; water content: 5.2%±0.15), and
sunflower seeds (provenance: Spain; supplier: L'ile aux épices; batch LPR22-1017; water content: 2.54%±0.12).

The food oils extracted from these three oleaginous seeds are among the most produced in the world apart from palm oil.

In this example 3, solid/liquid extraction is carried out by the extraction method called maceration under reflux, as this method is more suitable for the two-phase solvent than the "Soxhlet" method of extraction.

Example 3-1 According to the Invention: The Substrate is Soybean

In this example 3-1, the biological substrate is soybean.

About 50 g of dehulled soybeans are ground using a cutting mill in order to obtain particles smaller than 1 mm. 30 g of the powder obtained is weighed and put in a 250-mL glass flask surmounted by a condenser so as to be able to employ extraction under reflux.

Then 170 mL of each solvent is introduced into the flask and then the contents of the flask are refluxed using a flask heater.

The extraction time is fixed at 2 h starting from the first sign of reflux. At the end of the 2 h, the heating is switched off and the mixture is left to cool at room temperature for 20 min.

Next, the flask contents are filtered on a bed of cotton so as to separate on one side the solid residue of the solvent containing the oil, collected in a new 250-mL flask. The solvent is then evaporated using a rotary evaporator at reduced pressure (150 rev/min, 50° C.; 180 mbar, then 1 mbar to finish). The crude oil thus obtained is weighed and then the traces of residual solvent are removed by a light stream of nitrogen for 10 minutes. The oil is transferred to a sealed tube and then stored in the freezer at −20° C. until the analyses.

For each exemplified solvent, the concentration of polyphenols by weight is presented in Table 2.

Example 3-2 According to the Invention: The Substrate is Colza Seed

The procedure for this example 3-2 according to the invention is identical to example 3-1 according to the invention apart from the substrate, which is colza seed.

For each example solvent, the concentration of polyphenols by weight is presented in Table 3.

Example 3-3 According to the Invention: The Substrate is Sunflower Seed

The procedure for this example 3-3 according to the invention is identical to example 3-1 according to the invention apart from the substrate, which is dehulled sunflower seed.

For each example solvent, the concentration of polyphenols by weight is presented in Table 4.

Comparative Example 3-4: Hexane

The operating protocol and the biological substrates are the same as in examples 3-1 to 3-3, except that the solvent is hexane.

For each biological substrate, the concentration of polyphenols by weight is presented in Tables 2, 3 and 4.

Comparative Example 3-5: Anhydrous 2-Methyloxolane

The operating protocol and the biological substrates are the same as in examples 3-1 to 3-3, except that the solvent is anhydrous 2-methyloxolane.

For each biological substrate, the concentration of polyphenols by weight is presented in Tables 2, 3 and 4.

TABLE 2

The substrate is soybean MeTHF denotes 2-methyloxolane

| Solvent | Concentration of polyphenols by weight (ppm) |
|---|---|
| Hexane (comparative) | 58 |
| Anhydrous MeTHF (comparative) | 266 |
| MeTHF + 1% $H_2O$ (according to the invention) | 396 |
| MeTHF + 4.5% $H_2O$ (according to the invention) | 699 |
| MeTHF + 10% $H_2O$ (according to the invention) | 813 |
| MeTHF + 20% $H_2O$ (according to the invention) | 787 |

TABLE 3

The substrate is colza seed MeTHF denotes 2-methyloxolane

| Solvent | Concentration of polyphenols by weight (ppm) |
|---|---|
| Hexane (comparative) | 6 |
| Anhydrous MeTHF (comparative) | 58 |
| MeTHF + 1% $H_2O$ (according to the invention) | 124 |
| MeTHF + 4.5% $H_2O$ (according to the invention) | 177 |
| MeTHF + 10% $H_2O$ (according to the invention) | 240 |
| MeTHF + 20% $H_2O$ (according to the invention) | 270 |

TABLE 4

The substrate is sunflower seed MeTHF denotes 2-methyloxolane

| Solvent | Concentration of polyphenols by weight (ppm) |
|---|---|
| Hexane (comparative) | 49 |
| Anhydrous MeTHF (comparative) | 52 |
| MeTHF + 1% $H_2O$ (according to the invention) | 140 |
| MeTHF + 4.5% $H_2O$ (according to the invention) | 181 |
| MeTHF + 10% $H_2O$ (according to the invention) | 171 |
| MeTHF + 20% $H_2O$ (according to the invention) | 84 |

The results in Tables 2 to 4 show that the process for producing a crude oil according to the invention using a solvent comprising 2-methyloxolane and from 1% to 20% of water makes it possible to produce an oil richer in polyphenols than the oil obtained with hexane (reference solvent) and with anhydrous 2-methyloxolane.

The total concentrations of polyphenols by weight obtained by the method of extraction called maceration under reflux (examples 3 and 4) are logically lower than those obtained by the "Soxhlet" method of extraction (examples 1 and 2). In fact, in contrast to the "Soxhlet" method of extraction, the solvent used in the method of extraction called maceration under reflux gradually becomes concentrated in the extract, thus limiting the extraction of the oil and of the polyphenols, in accordance with the laws of mass transfer known by a person skilled in the art.

Example 4: Production of a Defatted Cake

Example 4-1: The Substrate is Soybean Flakes and the Solvent Comprises 2-Methyloxolane and 4.5% of Water Solid/liquid extraction was carried out using an automatic extraction system (Extraction System B-811, Büchi), starting from soybean flakes (supplier: OLEAD, harvest: France, 2017, water content: 9.96%±0.20%, oil content=19.19%±0.20%, thickness≈1 mm). The solvent used is a mixture of 2-methyloxolane (Stabilized with BHT, Sigma Aldrich) containing 4.5 g of distilled water per 100 g of solvent.

About 15 g of soybean flakes are weighed and put in an extraction cartridge made of cellulose suitable for the apparatus (Büchi). The cartridge is then put in the extraction chamber, in accordance with the instructions given in the user manual for the apparatus. The height of the level detector is set so that the maximum volume of solvent in the extraction chamber is equal to about 220 mL.

Then 170 mL of solvent is put in the 250-mL receiving beaker provided for this purpose. Then the apparatus is parameterized so as to operate according to the "Standard Soxhlet" mode, without rinsing or desiccation, with a time fixed at 1 hour and a heating power equal to 12 so as to guarantee a number of cycles of filling-emptying of the extraction chamber equal to 7±1 per hour. The condensers are supplied with tap water, with a flow rate sufficient to guarantee condensation of the solvent vapors that will be generated.

The solvent is then brought to the boil by means of the integrated heating plate. At the end of 60 min of extraction, all the solvent containing the extracted oil is collected in the receiving beaker, whereas the defatted cake remains inside the cartridge. The contents of the receiving beaker are then transferred to a suitable flask and then the mixture is desolvated according to the conditions stated in the preceding examples. The cartridge containing the defatted cake is recovered and then placed in a ventilated desiccator (Biosec type, model=TauRo) operating at a temperature of about 45° C. for at least 10 hours and in any case until the odor of the solvent is no longer perceptible. Once desolvated, the concentration of residual oil by weight in the defatted cake is determined according to standard NF EN ISO 734: February 2016, applied using the automatic extraction system (Extraction System B-811, Büchi) according to the "Continuous Extraction" mode corresponding to the method called "Twisselmann", with a slight modification as the material to be analyzed is finely ground using a cutting mill instead of a micro-ball mill.

The concentration of residual oil by weight obtained after extraction with 2-methyloxolane+water is presented in Table 5.

Example 4-2: The Substrate is Colza Flakes and the Solvent Comprises 2-Methyloxolane and 4.5% of Water Solid/liquid extraction was carried out according to the same protocol as in example 4-1, except that the substrate is colza flakes (supplier: OLEAD, harvest: France, 2017, water content: 8.21%±0.13%, oil content=23.03%±0.07%, particle size 3 mm) and the extraction time is 90 min.

The concentration of residual oil by weight obtained after extraction with 2-methyloxolane+water is presented in Table 5.

Example 4-3: The Substrate is Sunflower Flakes and the Solvent Comprises 2-Methyloxolane and 4.5% of Water Solid/liquid extraction was carried out according to the same protocol as in example 4-1, except that the substrate is sunflower flakes (supplier: OLEAD, harvest: France, 2017, water content: 5.38%±0.24%, oil content=30.81%±2.59%, particle size 10 mm) and the extraction time is 90 min.

The concentration of residual oil by weight obtained after extraction with 2-methyloxolane+water is presented in Table 5.

Comparative Example 4-4: Hexane

The operating protocol and the biological substrates are the same as in examples 4-1 to 4-3, except that the solvent is hexane and the heating power is fixed at 9 so as to guarantee a number of cycles of filling-emptying of the extraction chamber equal to 7±1 per hour.

For each biological substrate, the concentrations of residual oil by weight obtained after extraction with hexane are presented in Table 5.

Comparative Example 4-5: Anhydrous 2-Methyloxolane

The operating protocol and the biological substrates are the same as in examples 4-1 to 4-3, except that the solvent is anhydrous 2-methyloxolane and the heating power is fixed at 12 so as to guarantee a number of cycles of filling-emptying of the extraction chamber equal to 7±1 per hour.

For each biological substrate, the concentrations of residual oil by weight obtained after extraction with anhydrous 2-methyloxolane are presented in Table 5.

TABLE 5

| Biological substrate | Concentration of residual oil by weight (g /100 g of dry matter) | | |
| --- | --- | --- | --- |
| | 2-methyl-oxolane + water (according to the invention) | anhydrous 2-methyloxolane (comparative) | Hexane (comparative) |
| Soybean flakes | 0.44 | 0.92 | 1.49 |
| Colza flakes | 0.67 | 1.08 | 2.22 |
| Sunflower flakes | 1.73 | 1.82 | 2.90 |

The results in Table 5 show that the process for producing a solid residue according to the invention using a solvent comprising 2-methyloxolane and 4.5% of water makes it possible to produce a solid residue comprising less residual oil than the solid residue obtained with hexane (reference solvent) and with anhydrous 2-methyloxolane.

This is particularly advantageous as it makes it possible to limit the losses of oil, facilitate removal of the residual solvent from the solid residue, increase the concentration of proteins in the solid residue, improve its stability in storage and facilitate its digestion by animals, in particular bovines.

Example 5: Pilot-Scale Test with Soybean

Example 5-1 According to the Invention: The Substrate is Soybean and the Solvent is a Mixture of 2-Methyloxolane and Water Extraction of crude soybean oil was carried out on a pilot scale in a 480-L filter-dryer ("Guedu" type). The soybeans (Supplier: OLEAD, harvest: France, 2017, water content: 12.2%) were prepared for extraction by conventional steps of dehulling and flaking so as to reduce the particle size and increase the accessibility of the extraction solvent. Then about 60 kg of soybean flakes were put in the filter-dryer, and then extracted by three successive passes of 2-methyloxolane (supplier=Pennakem LLC; unstabilized). The water content is different at each pass, respectively 1.44%, 2.85% and then 4.76%.

The extraction temperature was on average 57±6° C., the solvent/solid weight ratio was fixed at 1.8 kg/kg and the extraction time at 15 min per pass, or 3×15 min in total.

The solvent containing the extracted oil (mixture called miscella) was collected by filtration after each pass, then concentrated by means of a distillation column (80-85° C., at reduced pressure) and finally desolvated using a rotary evaporator (Hei-VAP ADVANTAGE, Heidolph, Germany) under vacuum, at 60° C. until there was absence of condensation of solvent, and then for 1 hour at 90° C. The desolvated extract was then centrifuged (4000 rpm/4 min) in order to remove a solid fraction extracted by the mixture of 2-methyloxolane and water, but which became insoluble in an oily medium. The crude oil obtained is then stored at −20° C. before refining or analysis.

Once extraction has ended, the solid residue (defatted and filtered flakes) is desolvated in the same vessel ("Guedu" filter-dryer). The vessel is connected to a vacuum generator and then heated at 55° C. for 140 min, with injection of a nitrogen stream (14-18 L/min) to aid desolvation. Finally, the solid residue is discharged, spread on a plate and exposed to the ambient air for 1 day in order to remove the traces of residual solvent.

The crude oil obtained then undergoes a conventional step of chemical refining comprising a step of degumming at neutral pH and then at acid pH, followed by a neutralizing step, a bleaching step and then a deodorizing step to obtain a refined oil.

The concentration of polyphenols and of tocopherols by weight in the crude oil, and the concentration of tocopherols and of 2-methyloxolane by weight in the refined oil are presented in Table 6.

Comparative Example 5-2: The Substrate is Soybean and the Solvent is Anhydrous 2-Methyloxolane The operating protocol of the extraction is identical to example 5-1 according to the invention except for the following points: the solvent is anhydrous 2-methyloxolane (unstabilized), the solvent/solid ratio is 2.9 kg/kg, and the extraction temperature is 53±5° C.

The concentration of polyphenols and of tocopherols by weight in the crude oil, and the concentration of tocopherols and of 2-methyloxolane by weight in the refined oil are presented in Table 6.

Comparative Example 5-3: The Substrate is Soybean and the Solvent is Hexane

The operating protocol of the extraction is identical to example 5-1 according to the invention except for the following points: the solvent is hexane (extraction grade), the solvent/solid ratio is 2.2 kg/kg, and the extraction temperature is 52±3° C.

The concentration of polyphenols and of tocopherols by weight in the crude oil, and the concentration of tocopherols by weight in the refined oil are presented in Table 6.

TABLE 6

| | 2-methyloxolane + water (according to the invention) | Hexane (comparative) | anhydrous 2-methyloxolane (comparative) |
| --- | --- | --- | --- |
| Concentration of polyphenols by weight in the crude oil (ppm) | 106 | Not detected | 71 |
| Concentration of tocopherols by weight in the crude oil (ppm) | 2432 | 422 | 1010 |
| Concentration of tocopherols by weight in the refined oil (ppm) | 2335 | 344 | 908 |
| Concentration of 2-methyloxolane by weight in the refined oil (ppm) | <1 | Not detectable | <1 |

The results in Table 6 show that the process for producing a crude oil according to the invention using a solvent comprising 2-methyloxolane and 1.44% to 4.76% of water makes it possible to produce a crude oil richer in polyphenols than the crude oil obtained with hexane (reference solvent) and with anhydrous 2-methyloxolane.

The results in Table 6 also show that the process for producing a crude oil according to the invention using a solvent comprising 2-methyloxolane and 1.44% to 4.76% of water makes it possible to produce a refined oil richer in tocopherols than the refined oil obtained with hexane (reference solvent) and with anhydrous 2-methyloxolane.

The invention claimed is:

1. A process for producing a polyphenol-rich crude oil from a biological substrate comprising a step of:
   a) solid/liquid extraction of the biological substrate with a solvent to obtain on the one hand a liquid fraction comprising the crude oil and the solvent and on the other hand a solid residue,
   wherein,
   the solvent is a mixture of 2-methyloxolane and water, the percentage of 2-methyloxolane by weight in the solvent in the extraction step a) is higher than 80%, and
   the percentage of water by weight in the solvent in the extraction step a) is from 0.3% to 20%.

2. The process according to claim 1, in which the biological substrate is selected from a plant, an alga, a microorganism and mixtures thereof.

3. The process according to claim 2, in which the biological substrate is a plant selected from almond, amaranth, peanut, argan, sea buckthorn, cashew tree, avocado, oat, borage, safflower, camelina, carrot, cocoa, cashew, hemp, colza, copra, cucurbit, cotton, croton, rosehip, fig, prickly pear, pomegranate, hop, illipé, jojoba, karite, flax, lupine, maize, hazel, walnut, coconut palm, poppy, olive, evening primrose, cabbage palm, paprika, pistachio, pepper, castor-oil plant, rice, musk rose bush, sesame, soybean, marigold, sunflower, *Calophyllum inophyllum*, madhuca, Queensland walnut, raspberry, blackcurrant, melon, grape, tomato, baobab, babassu, cranberry, chia, pumpkin, mustard, neem, *Nigella sativa*, niger, poppy, pecan, Perilla, *Plukenetia volubilis*, pumpkin, annatto, Taramira, apricot, plum, peach, wheat.

4. The process according to claim 1, in which the extraction step a) is carried out at a temperature of 20° C. to 100° C.

5. The process according to claim 1, comprising, in addition to the extraction step a), the following steps:
   b) recovering the liquid fraction comprising the crude oil and the solvent, and
   c) separating the crude oil and the solvent from the liquid fraction to recover on the one hand the crude oil and on the other hand the solvent.

6. A process for producing a refined oil comprising a step of refining the crude oil recovered in step c) of the process for producing a crude oil as defined in claim 5.

7. A process for producing a solid residue comprising a step e) of recovery of the solid residue obtained in step a) of solid/liquid extraction of the process as defined in claim 1.

8. A process for producing a desolvated solid residue further comprising a step f) of desolvation of the solid residue recovered in step e) of the process as defined in claim 7 to recover on the one hand the solvent and on the other hand the desolvated solid residue.

9. A process for producing a byproduct comprising a step g) of transforming the desolvated solid residue recovered in step f) of the process as defined in claim 8 to obtain the byproduct.

10. The process according to claim 9, in which the byproduct is selected from a flour, a protein concentrate, a protein isolate, a textured protein and mixtures thereof.

11. A crude oil derived from a biological substrate, said crude oil comprising a polyphenol and 2-methyloxolane, the concentration of polyphenol by weight being greater than or equal to 320 ppm.

12. The crude oil according to claim 11, in which the concentration of 2-methyloxolane by weight is from 0.5 ppm to 500 ppm.

13. A refined oil derived from a biological substrate comprising a tocopherol, the concentration of tocopherol by weight being greater than or equal to 1500 ppm.

14. The refined oil according to claim 13 further comprising 2-methyloxolane.

15. A solid residue derived from a biological substrate and comprising a polyphenol and a residual oil, wherein the concentration of polyphenol by weight is less than or equal to 3000 ppm and the concentration of residual oil by weight is less than or equal to 5%.

16. The solid residue according to claim 15 further comprising 2-methyloxolane.

17. A desolvated solid residue derived from a biological substrate comprising 2-methyloxolane, wherein the concentration of 2-methyloxolane by weight is below 1000 ppm.

18. A byproduct derived from a biological substrate comprising 2-methyloxolane, wherein the concentration of 2-methyloxolane by weight is below 1000 ppm.

19. The byproduct according to claim 18 selected from a flour, a protein concentrate, protein isolate, a textured protein, and mixtures thereof.

20. The process according to claim 1 wherein the mixture is a binary mixture.

* * * * *